United States Patent [19]

Taylor et al.

[11] Patent Number: 4,770,736

[45] Date of Patent: Sep. 13, 1988

[54] CONSTANT VELOCITY TRANSFER MECHANISM

[75] Inventors: Henry J. Taylor, Markdale; John A. Fry, Ajax, both of Canada

[73] Assignee: Vadeko International, Inc., Ontario, Canada

[21] Appl. No.: 927,798

[22] Filed: Nov. 5, 1986

[30] Foreign Application Priority Data

Feb. 19, 1986 [CA] Canada .................................. 502160

[51] Int. Cl.[4] ......................... B32B 31/00; B44C 1/00

[52] U.S. Cl. .................................... 156/378; 156/497; 156/542; 156/238

[58] Field of Search ............... 156/230, 240, 540, 541, 156/361, 378, 446, 481, 494, 495, 496, 497, 542, 543, 577, DIG. 33, DIG. 39, 584, 238; 400/162, 145.1, 145.2, 151, 151.1

[56] References Cited

U.S. PATENT DOCUMENTS

| | | | |
|---|---|---|---|
| 3,690,252 | 9/1972 | Sokolov | 101/147 |
| 3,943,023 | 3/1976 | Weingrad | 156/540 |
| 4,288,281 | 9/1981 | Kanda | 156/541 |
| 4,328,061 | 5/1982 | Off et al. | 156/540 |
| 4,333,781 | 6/1982 | Meulenberg | 156/361 |
| 4,342,614 | 8/1982 | Vanden Bergh | 156/541 |
| 4,350,555 | 9/1982 | Popoff | 156/240 |
| 4,451,318 | 5/1984 | Off et al. | 156/361 |
| 4,465,538 | 8/1984 | Schmoock | 156/233 |
| 4,508,589 | 4/1985 | Tarui et al. | 156/344 |
| 4,557,783 | 12/1985 | Grone et al. | 156/361 |

FOREIGN PATENT DOCUMENTS

| | | |
|---|---|---|
| 984345 | 2/1976 | Canada . |
| 1081177 | 8/1980 | Canada . |

*Primary Examiner*—Michael Ball
*Assistant Examiner*—Louis Falasco
*Attorney, Agent, or Firm*—Rodman & Rodman

[57] ABSTRACT

An apparatus has a rotary member mounted to it for rotating around a fixed axis of rotation, and also has a support member secured to it to extend tangential to the rotary member, the location of tangency being defined as a workstation. A continuous first medium extends around substantially the whole periphery of the rotary member. The first medium moves relative to the periphery due to a mechanism on the rotary member which continuously withdraws a portion of the first medium from the periphery and replaces that withdrawn portion with a new portion. The first medium is thereby pulled along the periphery of the rotary member in the same direction in which the rotary member is adapted to rotate. A second medium moves along the support member and through the workstation at the same speed as that at which the first medium passes through the workstation. A series of engagement members are positioned equiangularly around the rotary member, each engagement member as it passes through the workstation forcing those portions of the first and second mediums in the workstation into engagement. For a rotary member having N engagement members, an optimum utilization of the first medium occurs when the ratio of the speed at which the first medium passes through the workstation relative to the speed at which the periphery of the rotary member passes through the workstation is (N−1)/(N−2).

14 Claims, 8 Drawing Sheets

CONSTANT VELOCITY TRANSFER MECHANISM

This invention relates to an apparatus for providing a repeating interaction between a first medium and a second medium wherein both mediums are continuously-fed. More particularly, the invention relates to an apparatus that brings two mediums into engagement at the same velocity but results in different spacing between successive engagement points on the two mediums.

Line production of items sometimes requires that an operation be carried out on the items by bringing a continuous ribbon into engagement with each item as the item passes through an engagement zone with the ribbon. Such a ribbon may carry a detachable material for labelling or decorating the items. If only a short length of the ribbon is utilized for each item and has a dimension less than that of the item, as is usually the case, and if no portion of the length of the continuous ribbon is to be wasted, the ribbon feed rate must be either continuous and at a speed below that of the line or it must be discontinuous, i.e. in a series of discrete steps each at the speed of the line. Both of these arrangements have their disadvantages. In the former situation, the difference in speed at the engagement zone may result in an insufficient or improper contact; in the latter situation, the mechanism for creating stepped movement of the ribbon is subject to mechanical inefficiency. The subject apparatus seeks to overcome such difficulties by allowing the item line and the ribbon to come into engagement when both ae continuously-fed at the same speed while also allowing generally all of the length of the ribbon to be utilized.

The apparatus of the subject invention utilizes a generally circular rotary member and the engagement zone is a position at which the item line extends tangential to the rotary member. The ribbon to be brought into engagement with the line of items extends around the circumference of the rotary member and is adapted to move relative to that circumference by a mechanism internal of the rotary member; that mechanism continuously feeds new ribbon to the circumference while withdrawing an equal amount from the circumference. The rotation of the rotary member, the feeding and withdrawing of the ribbon from the circumference of the rotary member, and the movement of the item line are such that the ribbon and items on the line are brought into engagement in the engagement zone while moving at the same speed. The engagement is created by a series of engagement members which are fixed to the circumference of the rotary member at equiangular positions. As each engagement member passes through the engagement zone it presses the portion of the ribbon adjacent to it against a respective one of the items moving on the line. It has been found that a certain relationship exists which allows maximum utility to be made of the ribbon. The relationship is between on the one hand the number of engagement members on the rotary member and on the other hand the ratio of the speed of the periphery of the rotary member to the speed of the ribbon. If the rotary member has N engagement members equiangularly positioned on its periphery, then maximum utility of the ribbon occurs when the speed of the ribbon around the rotary member is $(N-1)/(N-2)$ times the peripheral speed of the rotary member.

In its most general form the apparatus of the subject invention includes a rotatable structure, a first medium advancement mechanism secured to the rotatable structure so as to rotate with that structure, and a second medium advancement mechanism extending generally tangential to the rotatable structure at a workstation. The rotatable structure has a generally circular periphery to which a series of engagement members are fixed at equiangular positions and along which a first medium is adapted to extend. The first medium advancement mechanism is adapted to continuously feed the first medium along the periphery of the rotatable structure in the same direction in which the rotatable structure is adapted to rotate such that the first medium moves at a speed greater than the speed of the adjacent periphery of that rotatable structure. The second medium advancement mechanism is adapted to continuously feed a second medium through the workstation at the same speed that the first medium enters the workstation on the periphery of the rotatable structure, the first and second mediums coming into engagement as they pass through the workstation. The rotatable structure and the first medium advancement mechanism are adapted to be driven such that the ratio between the speed of the first medium and the speed of the adjacent periphery of the rotatable structure is $(N-1)/(N-2)$ when N engagement members are present on the rotatable structure.

The first medium advancement mechanism may be secured to the rotatable structure internal of that structure. That mechanism may be driven by a drive linkage means connecting the mechanism to the rotatable structure such that rotation of the rotatable structure advances the first medium along the periphery of that structure, the first medium thereby moving at a speed greater than that of the periphery. The first medium advancement mechanism may be comprised of a pair of rollers biased toward each other with the first medium being adapted to extend therebetween. The rollers may be rotatably driven by a first drive linkage means connecting the rollers to the rotatable structure such that rotation of the rollers acts to draw the first medium between them, the first medium thereby being pulled along the periphery of the rotatable structure and into that structure. The first medium advancement mechanism may also comprise a third roller rotatably driven by a second drive linkage means connecting the third roller to the rotatable structure, the first medium extending around the third roller as that medium leaves the rotatable structure. In such arrangement, whenever the tension on the first medium increases as it moves along the periphery of the rotatable structure that medium increases its frictional engagement with the third roller and is thereby fed out of the rotatable structure by that roller. In this manner the third roller acts to ensure that a uniform tension is continuously maintained on the first medium as that medium moves around the periphery of the rotatable structure.

In a further form of the invention, the second medium may be comprised of a continuous medium such as a strip. In a yet further form of the invention, the engagement members may be pads, each pad during its passage through the workstation acting to press the first medium against the second medium. In such further form of the invention the first medium may comprise a releasable portion adapted to adhere to the second medium when the two mediums are pressed together in the workstation and to release itself from the first medium as the two mediums move apart on leaving the workstation.

The subject invention will now be more completely described by means of the accompanying drawings, in which:

FIG. 1 to 12 inclusive illustrate 12 sequential operating positions of an apparatus representing a simple embodiment of the invention, that apparatus having four pads on the periphery of the rotary member.

The operation of the apparatus of this invention will first be described in terms of a simple example of the principle involved, then in a more general fashion, and finally, in terms of a practical embodiment.

Figure 1:
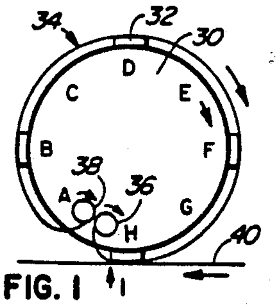
Figure 2:
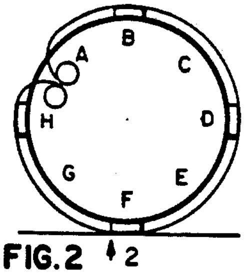

FIGS. 1 to 14 inclusive relate to a "2,3,4" apparatus, those numbers designating that the apparatus has four pads fixed equiangularly to the periphery of the rotary member and that the ratio of the speed of the ribbon passing around the periphery of the rotary memoer compared to the peripheral speed of the rotary member is in the ratio of 3 to 2. With reference to FIG. 1, the rotary member is designated as 30, each pad is designated as 32, and the ribbon of material that passes around the periphery of the rotary member 30 is designated as 34. A driven first spool 36, located inside of rotary member 30 such that its axis of rotation is parallel to that of rotary member 30, takes up ribbon 34 and in so doing draws ribbon 34 around the periphery of rotary member 30. A corresponding driven second spool 38, also located inside of rotary member 30 with an axis of rotation parallel to that of rotary member 30, simultaneously provides a corresponding amount of ribbon 34 to the periphery of rotary member 30. It should be emphasized that the practical embodiment of the apparatus of this invention does not have two spools which operate in the foregoing fashion, and those spools are utilized only to demonstrate the principle of the invention. The actual means by which ribbon 34 is fed to and retrieved from the periphery of a rotary member of a practical embodiment of the invention will subsequently be described. It should also be mentioned that ribbon 34 is depicted for illustrative purposes only as following a circular path. In actuality, ribbon 34 would extend in a generally chordal pattern between each of the adjacent pairs of pads 32 (see, for instance, FIGS. 19 and 20).

With further reference to FIG. 1, eight equiangularly-spaced positions on rotary member 30 are designated by the letters A, B, C, D, E, F, G, and H. The reason that eight positions are identified on the periphery of rotary member 30 instead of, say, twelve positions or sixteen positions should subsequently become more clear. FIG. 1 also illustrates a linefeed 40 moving tangential to rotary member 30 such that each of the four pads 32 apply a slight pressure to items on linefeed 40 as those pads sequentially pass the bottom position on rotary member 30, that bottom position henceforth being called "the workstation" (occupied by position H of rotary member 30 in FIG. 1).

A principle of the operation of the apparatus is that the ribbon 34 passes through the workstation at the same speed at which the linefeed 40 passes through the workstation. The periphery of rotary member 30 and the four pads 32 thereon are, however, moving at a slower speed than ribbon 34. The difference in the speed of ribbon 34 and each of the pads 32 is created by the continuous action of first spool 36 and second spool 38. With four pads 32 present, the desired ratio between the speed of the ribbon and the speed of the rotary member's periphery is 3 to 2; the actual value of those speeds will depend upon the diameter of rotary member 30 and the radial thickness of the pads 32. The speed of linefeed 40 is usually fixed by other parameters in a manufacturing facility, and the speed of ribbon 34 on the periphery of rotary member 30 must therefore be matched to that linefeed speed. Once the speed of ribbon 34 is obtained, the diameter and angular speed of rotary member 30 and the number of pads 32 on its periphery are selected so as to obtain the benefits of the invention. Further discussion will be made on these points when the working embodiment is described.

FIGS. 1 to 12 inclusive represent twelve sequential one-quarter turns of rotary member 30. Every time one of the pads 32 enters the workstation of the apparatus that pad presses that portion of ribbon 34 temporarily adjacent to it against the item at that time passing through the workstation on linefeed 40, an impression being thereby made on ribbon 34. Since the pad moves through the workstation at a slower speed (two-thirds of the linefeed speed for the 2,3,4 apparatus) than the speed of ribbon 34 it is necessary that the working surface of the pads have a low coefficient of friction. As subsequently described, air may be fed to each pad to reduce the friction between the surface of the pad and the ribbon moving across it.

Figure 3:
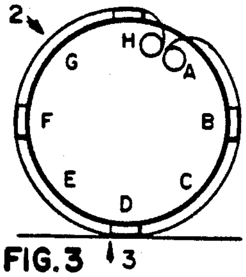

Returning to FIGS. 1 to 12, FIG. 2 illustrates rotary member 30 after it has rotated one-quarter turn clockwise from its position in FIG. 1. In this position the pad 32 which is at the position F on rotary member 30 in FIG. 1 has now entered the workstation and pressed the adjacent portion of ribbon 34 against an item on linefeed 40; a second impression has thereby been created on ribbon 34. The portion of ribbon 34 that was in the workstation in FIG. 1, and on which the first impression was made, has now entered onto first spool 36; that follows from the fact that ribbon 34 is moving at a speed on the periphery of rotary member 30 that is 1.5 times as great as the speed of the periphery (and thus the pads 32) of rotary member 30. With respect to FIG. 3, the pad 32 at position D of rotary merber 30 has entered the workstation and made a third impression on the ribbon 34. Although the ribbon 34 has advanced on the periphery of rotary member 30, that portion of ribbon 34 bearing the second impression (i.e. that created by the pressure of pad 32 at position F in FIG. 2) is still present on that portion of ribbon 34 extending around the periphery of rotary member 30. In FIG. 3, the position of that second impression is indicated by the arrow having the adjacent numeral 2; every such arrow in the figures points to an impression made by one of the pads 32 on ribbon 34, the number beside the impression indicating the order of its creation.

Figure 4:
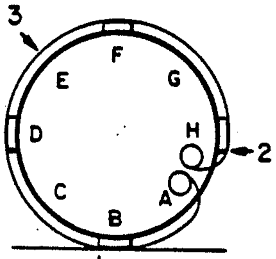
Figure 5:
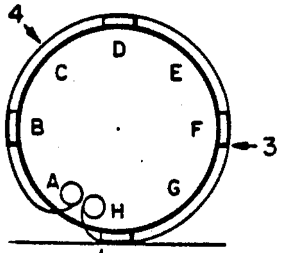
Figure 6:
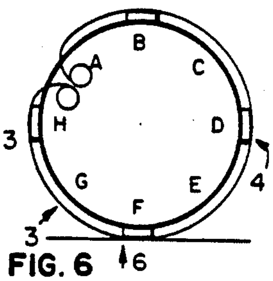
Figure 7:
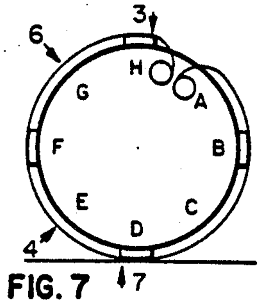
Figure 8:
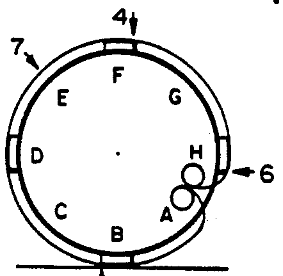
Figure 9:
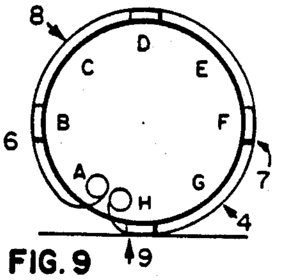
Figure 10:
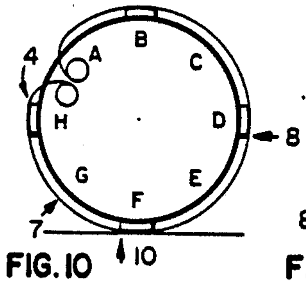
Figure 11:
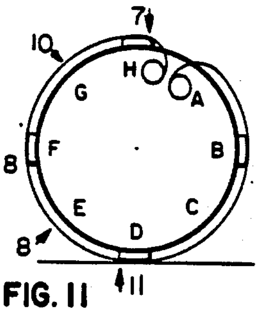
Figure 12:
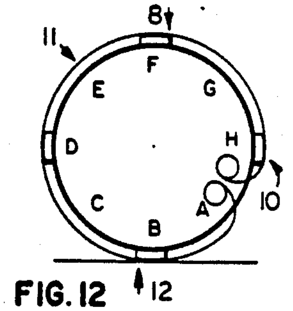

FIGS. 4 to 12 illustrate the impressions made on ribbon 34 by the following nine one-quarter turns of rotary member 30. For instance, in FIG. 4 the pad 32 at position B on rotary member 30 is creating a fourth impression on ribbon 34, while the second and third impressions (made by the pads 32 at positions F and D in FIGS. 2 and 3, respectively) are still present on that portion of ribbon 34 extending around the periphery of rotary member 30. In FIG. 5, the second impression has disappeared, that impression having been wound onto first spool 36.

Figure 13:
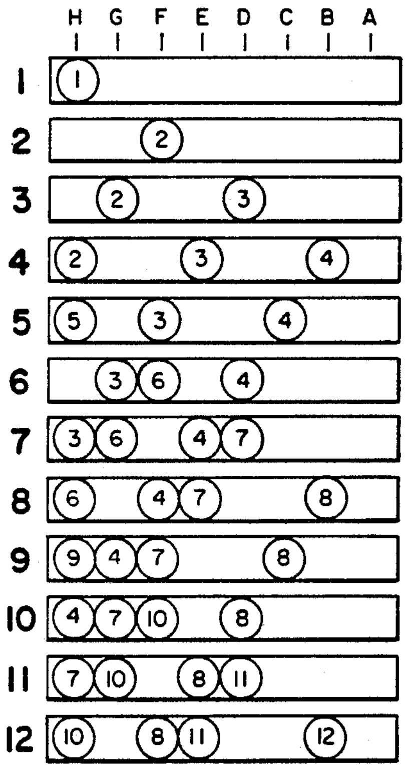
FIG. 13 illustrates the impressions made on that portion of the ribbon surrounding the rotary member for each of the twelve sequential operating positions of FIGS. 1 to 12.

FIG. 13 represents the impressions that one would see if they removed the ribbon 34 surrounding rotary member 30 immediately after the ribbon has been impacted by the adjacent pad in the workstation in each of the FIGS. 1 to 12. For instance, the second ribbon from the top in FIG. 13 has a circled 2 directly under the letter F. The impression made by pad 32 in FIG. 1 is not present since that part of ribbon 34 has moved off of the periphery of rotary member 30 and onto first spool 36. With reference to FIG. 13, it can be seen that the difference between each successive portion of ribbon 34 illustrated is a movement of one position to the left.

With reference to FIGS. 4, 5 and 13, it can be seen that an interesting phenomena occurs between the fourth and fifth impressions made on ribbon 34. In FIG. 5, the second impression has just been wound onto the first spool 36 when the fifth impression is made at the following position on ribbon 34. The fifth portion of ribbon 34 illustrated in FIG. 13 reflects what has occurred. The reason that it has occurred will be more fully explained subsequently.

With reference to FIG. 13, it can be seen that impressions 6 and 7 are in their expected positions when it is considered that those impressions are separated by three parts of ribbon 34 and that that ribbon itself is moving left with each successive portion illustrated in FIG. 13. As with the fifth impression, it can be seen from FIGS. 8, 9 and 13 that the ninth impression is made on ribbon 34 just prior to that position on ribbon 34 being wound onto first spool 36. Although not shown in FIG. 13, the thirteenth impression on ribbon 34 would be the next impression to folow the pattern set by the fifth and ninth impression. From FIG. 13 it can be seen that the seventh portion of ribbon 34 has four impressions on it in the same positions as those on the eleventh portion of ribbon 34. Also, the eighth portion of ribbon 34 illustrated in FIG. 13 has impressions made in the same positions as the impressions on the twelfth portion of ribbon 34 illustrated in that figure. That can also be seen by comparing FIG. 7 with FIG. 11 and by comparing FIG. 8 with FIG. 12. If further portions of ribbon 34 were illustrated (the thirteenth and succeeding portions), they would all bear a repeating pattern with the impressions illustrated on portions 7, 8, 9, and 10 of ribbon 34 in FIG. 13.

Figure 14:
FIG. 14 illustrates the total impressions made on the ribbon, including that portion of the ribbon drawn into the rotary member, after the rotary member has moved through the twelve sequential operating positions of FIGS. 1 to 12.

FIG. 14 illustrates the impressions that would be seen on ribbon 34 if, after twelve impressions had been made on that ribbon, the ribbon were removed from the periphery of rotary member 30 and from first spool 36, and were then laid out flat. With reference to that FIGURE if the thirteenth impression had been made, it would have been made between the tenth and eighth impression. The fourteenth impression would then have been made after the eleventh impression. The fifteenth impression would then follow the twelfth impression. The sixteenth impression would then follow in the third space after the fifteenth impression, and the seventeenth impression would be made in the space between the thirteenth impression and the twelfth impression. The effect is that ribbon 34 is essentially filled with impressions during steady-state operation of the apparatus and a maximum use of the surface area of ribbon 34 is obtained.

Figure 15:
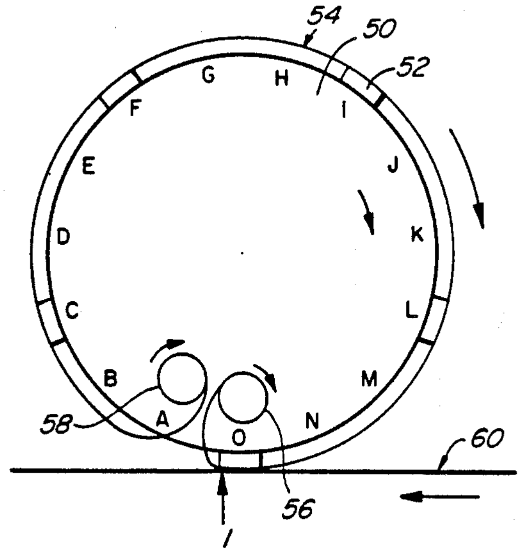
FIG. 15 illustrates an apparatus representing a further simple embodiment of the invention, that apparatus having five pads on the periphery of the rotary member.
Figure 17:
FIG. 17 illustrates the total impressions made on the ribbon of the apparatus of FIG. 15 after the apparatus has moved through twenty sequential operating positions, the ribbon of FIG. 17 including that portion of the ribbon drawn into the rotary member during that time.
Figure 16:
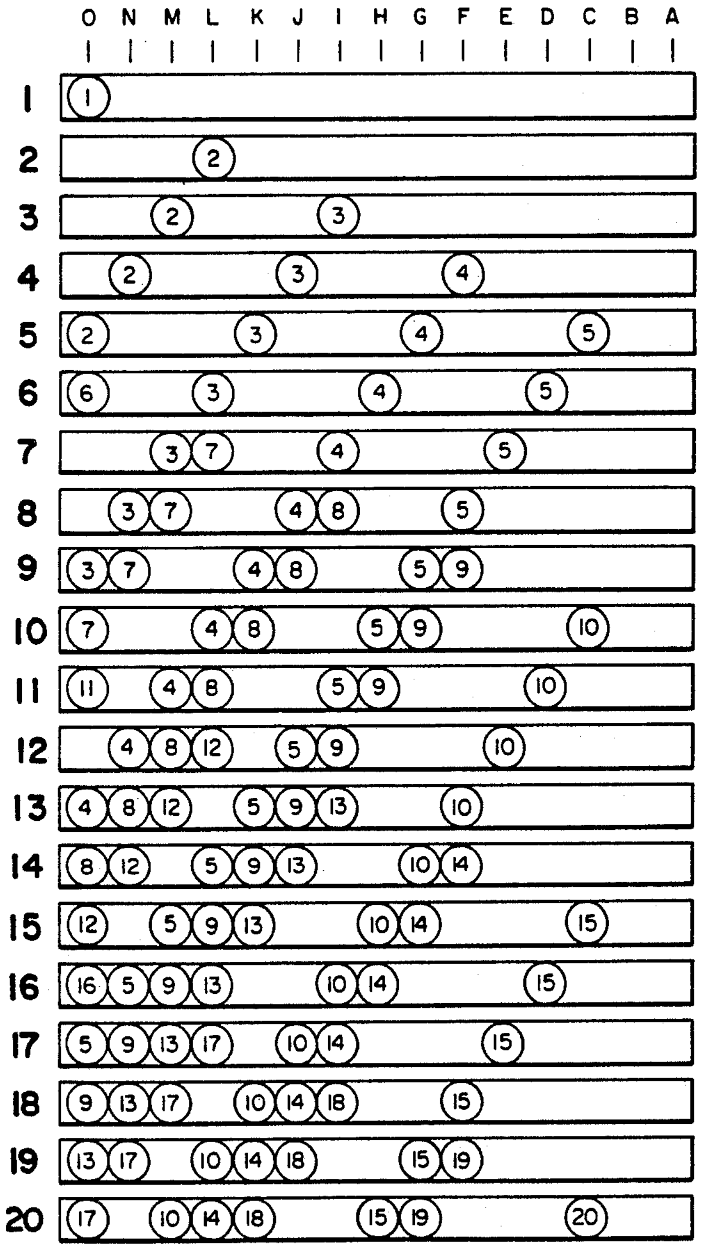
FIG. 16 illustrates the impressions made on that portion of the ribbon surrounding the rotary member for each of twenty sequential operating positions of the apparatus of FIG. 15.

FIGS. 15, 16 and 17 relate to a "3,4,5" apparatus. Rotary member 50 has five pads 52 fixed at equiangular positions around its periphery. A ribbon 54 extends around the periphery of rotary member 50, first spool 56 collecting ribbon 54 from the periphery of rotary member 50, and second spool 58 adding a compensating amount of ribbon 54 to that periphery. The speed of ribbon 54 is 4/3 times the speed of the outside surface of each pad 52. FIG. 16 represents 20 successive views of the portion of ribbon 54 present on the periphery of rotary member 50, each view being taken immediately after the impression having the corresponding number was made on ribbon 54. FIG. 16 can be seen to be analogous to FIG. 13, except that the steady-state condition is not achieved until the thirteenth impression, with portions 13, 14, 15, 16 and 17 representing the repeating pattern for the 3,4,5 apparatus. FIG. 17 can similarly be seen to be analogous to FIG. 14. FIGS. 14 and 17 can be seen to be equivalent to row H of FIG. 13 and row O of FIG. 16 respectively.

Having described the apparatus of the invention in terms of two specific embodiments, a general derivation of the principle governing the invention will next be undertaken.

Figure 18:
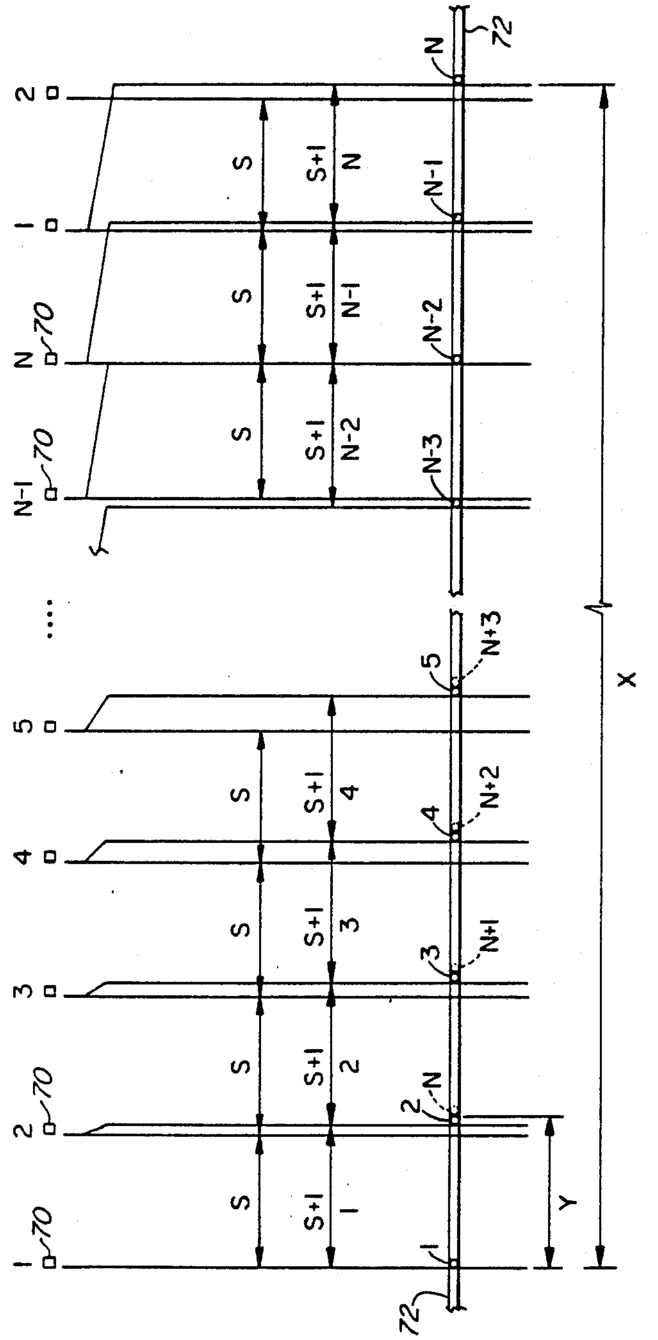
FIG. 18 is a schematic representation of the relationship between the N pads of a rotary member and the impressions created on a ribbon by the pads after approximately one rotation of the rotary member.

FIG. 18 is intended to illustrate the relationship between, on the one hand, a series of N pads 70 equiangularly positioned on the periphery of a rotary member, and on the other hand, the impressions made on a ribbon 72 extending around the periphery of the rotary member. If "S" represents the number of spaces between the corresponding positions on successive pads 70 on the periphery of the rotary member, then the number of spaces between successive impressions on ribbon 72 is "S+1". With reference to FIGS. 1 to 14, S is equivalent to 2 and S+1 is equivalent to 3. It will be remembered that for every one-quarter turn of rotary member 30, ribbon 34 was advanced a further one-eighth turn. With respect to the 3,4,5 apparatus of FIGS. 15, 16, and 17, S is equivalent to 3 and S+1 is equivalent to 4. Rotary member 50 has 15 equiangular positions on its periphery, and for each one-fifth turn of rotary member 50 ribbon 54 moves through a four-fifteenths turn on its periphery.

Returning to FIG. 18, it can be seen that if pad 1 makes impression 1 on ribbon 72, the subsequent impressions on ribbon 72 become more and more advanced relative to the corresponding pads 70. Not only do the impressions on the ribbon move increasingly away from their corresponding pad, but they are also continuously moving toward the next pad. For instance, impression 2 on ribbon 72 is just one space advanced on the position of pad 2, but impression 5 has advanced a further three spaces relative to pad 5. The compensating factor for the advancing movement of the impressions on ribbon 72 relative to the corresponding pads is the continuous withdrawal of spaces on ribbon 72 from the periphery of the rotary member; for each S spaces on ribbon 72 that pass through the workstation, one space is pulled into the rotary member. With reference to the right side of FIG. 18, it can be seen that N impressiOns on ribbOn 72 occupy NS+S+2, i.e. (N+1)S+2 spaces on that strip. A certain amount of ribbon 72, is, however, pulled into the rotary member during one full completion of that rotary member, and we equate the amount of ribbon 72 pulled into the rotary member during that one full rotation as equivalent to the spaces occupied by impression 1, impression 2, and all of the spaces on ribbon 72 between those two impressions. That allows impression N on ribbon 72 to correspond with the space after impression 2 on that ribbon. A relationship can be derived between N and S to place impression N in the space immediately following impression 2. With reference to FIG. 18, X−Y=NS, since we wish pad 1 to make impression N on the second revolution of the rotary member and there are NS spaces on the periphery of the rotary member The total amount of ribbon 72 used during one rotation of the rotary member is equivalent to N(S+1) spaces, but of that amount S+2 spaces (impression 1, impression 2 and the intervening spaces) are drawn inside of the rotary member during that one rotation. Therefore, N(S+1)−(S+2)=NS or N=S+2. this result can also be seen to follow when one considers that the number of spaces occupied by N impressions on strip 72 can be expressed as either (N+1)S+2 or N(S+1).

With reference to FIGS. 1 to 12, four pads are present, and S is equal to 2 and S+1 is equal to 3. Between FIGS. 1 and 5, rotary member 30 completes one full rotation and 8 spaces on its periphery pass through the workstation; at the same time, 12 spaces on ribbon 34 pass through the workstation, four of those spaces on ribbon 34 being drawn inside of rotary member 30 during that time. As earlier discussed, impression 5 in FIG. 5 is made adjacent to impression 2 (which has just been drawn within rotary member 30). In this case the X of FIG. 18 is equal to 4 spaces, the Y is equal to 12 spaces, and NS is equal to 8 spaces. An analogous situation can be seen to exist with respect to the 3,4,5 apparatus of FIGS. 15, 16 and 17, in which X is equal to 5 spaces, Y is equal to 20 spaces, and NS is equal to 15 spaces. With respect to that apparatus, impression 6 is made adjacent to impression 2 (which has just entered within rotary member 50). The 3,4,5 designation for the apparatus can be seen to be equivalent to (S),(S+1),(S+2), or alternatively, (N−2),(N−1),(N). The concept here described always holds true when the number of spaces between the corresponding positions on successive pads on the periphery of a rotary member is two less than the number of pads on that rotary member. It should now be more obvious why two positions were illustrated between each adjacent pair of pads 32 in FIGS. 1 to 12, and why three positions were illustrated between each adjacent pair of pads 52 in FIG. 15.

A working embodiment of an apparatus utilizing the inventive concept will next be described with reference to FIGS. 19, 20 and 21.

Figure 19:
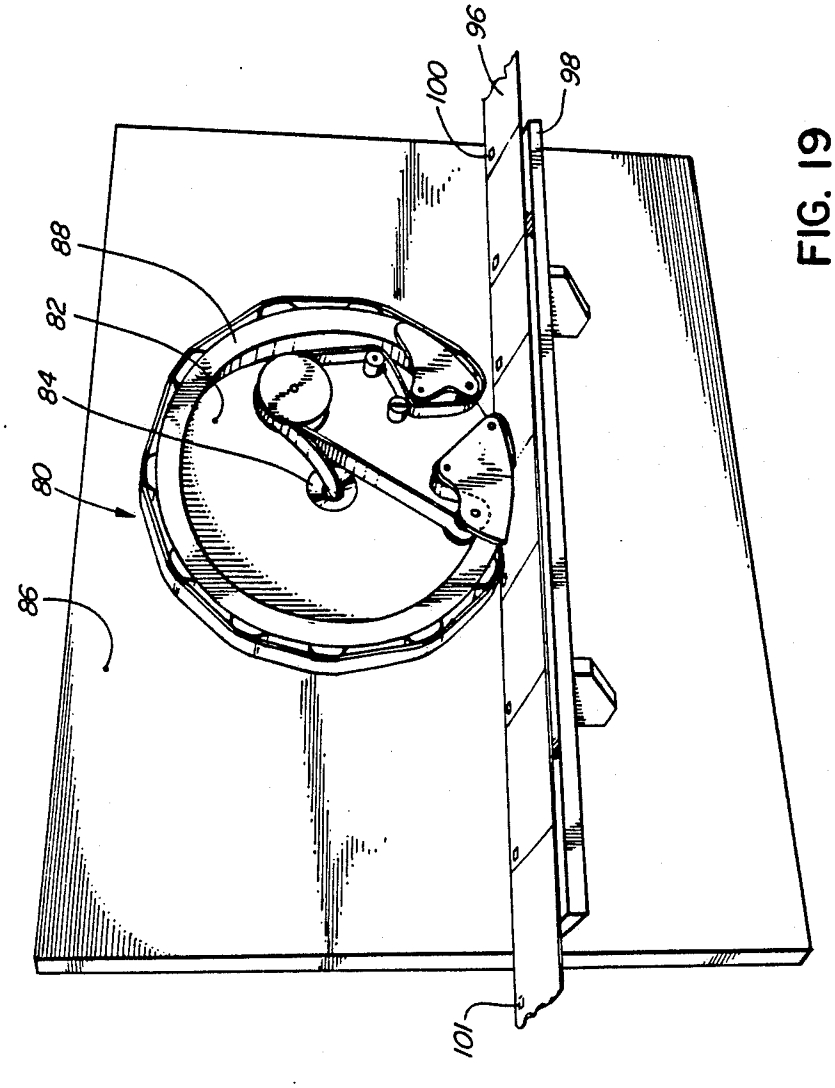
FIG. 19 is a perspective view of an apparatus representing a practical embodiment of the invention, that apparatus being utilized to place a plastic layer over each of a series of rectangular areas spaced from each other along a continuously-fed strip.

FIG. 19 illustrates, in perspective view, the working embodiment of the apparatus of the invention. A rotary member 80 is formed by a circular plate 82 which is mounted on a hollow axle 84, that hollow axle in turn being rotatably mounted by a bearing (not shown) to vertical wall member 86. Rotary member 80 is also comprised by an annular member 88 of rectangular cross-section, that annular member extending around the periphery of circular plate 82 and having a small opening for a purpose that will subsequently become more obvious. A motor 90, mounted to the backside of vertical wall 86, has a sprocket connected by a chain drive to a sprocket mounted concentrically on hollow axle 84; rotary member 80 can thereby be rotated at a selective speed.

Prior to discussing the pads 92 which are mounted to the outside face of annular member 88, and also prior to discussing ribbon 94 extending around the periphery of rotary member 89, the purpose of this working embodiment of the apparatus will be more fully explained. With reference to FIG. 19, a continuous strip 96 of material is pulled through the workstation while being supported on a shelf 98 which is itself supported by vertical wall member 86. Strip 96 represents a series of discrete printed images which have been printed but not separated. The apparatus is utilized to place a transparent plastic layer over a coded mark 100 formed on each image by a pigmented adhesive. As can be seen in FIGS. 19 and 21, the marks 100 are proximate of the same corner on each of the printed images The marks 100 are in the plane defined by annular member 88 and ribbon 94. As each mark 100 enters the workstation on strip 96, a corresponding pad 92 on rotary member 80 presses the adjacent part of ribbon 94 against that mark A transparent transfer layer is held to the backing portion of ribbon 94 by a "release layer". Upon leaving the workstation, a segment of the transfer layer of ribbon 94 having a contour matching mark 100 is sheared away from the backing portion of ribbon 94. FIG. 21 illustrates mark 101 on sheet 96, mark 101 being comprised of a pigmented adhesive mark 100 covered by a portion of the transfer layer of ribbon 94; a complementary image can be seen to be formed in ribbon 94 by the missing portion of the transfer layer.

Each of the printed images on strip 96 is six inches long. Since the ribbon 94 moves at a speed (S+1)/S, i.e. (N−1)/(N−2), times greater than the speed of the pads 92, the approximate circumference of rotary member 80 (to the outside of each pad 92) is:

$$\frac{N(N-2)}{(N-1)} \times 6 \text{ inches}$$

For a 14,15,16 apparatus, for example, the circumference would amount to approximately 89.6 inches which is equivalent to a diameter of approximately 28.5 inches. The diameter of the wheel can also be calculated for rotary members having other numbers of pads equiangularly positioned around their circumferences. For purposes of the printed image marking, a 9,10,11 apparatus was selected. In other words, the apparatus has 11 pads 92 equiangularly positioned around rotary member 80. Rotary member 80 has a circumference of approximately 59.4 inches and a diameter (to the outside of the pads 92) of approximately 18.9 inches. Strip 96 is fed from other equipment at a rate of 240 feet per minute, i.e. 480 uncut printed images per minute. Therefore, ribbon 94 must enter the workstation at 240 feet per minute Also, each pad 92 must enter the workstation at $(9/10)\times(240)$ feet/minute, or 216 feet per minute. Since the diameter of rotary member 80 for the 9,10,11 apparatus has l,een previously calculated, the rotational speed of rotary member 80 can be calculated. An accurately-made chain 105 can then be connected between the sprocket on motor 90 and the sprocket on the hollow axle 84 of rotary member 80. The speed of motor 90 is adjusted to exactly set the requisite speed at which each of the pads 92 enter the workstation.

It was earlier mentioned that it is not pcssible to utilize two spools 36 and 3B, as shown in FIGS. 1 to 12, to control movement of ribbon 94 on the periphery of rotary member 80. The difficulty in that regard relates to driving the two spools such that constant tension is maintained on ribbon 94. The means for holding ribbon 94 within rotary member 80 will next be described.

Figure 20:
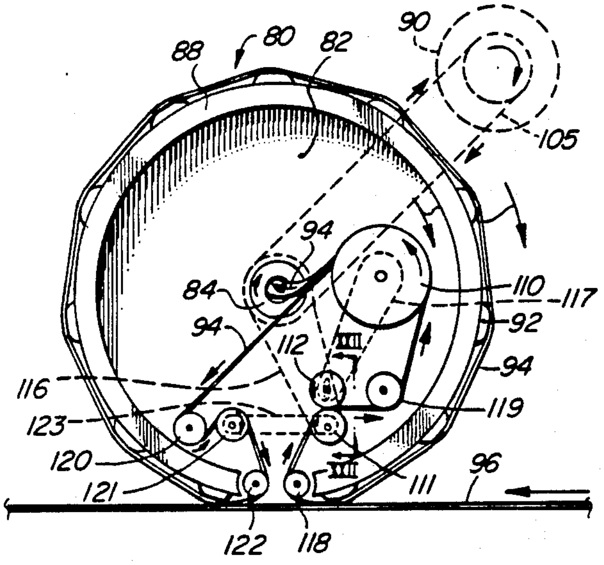
FIG. 20 is a partially-sectioned side view of the apparatus of FIG. 19.
Figure 21:
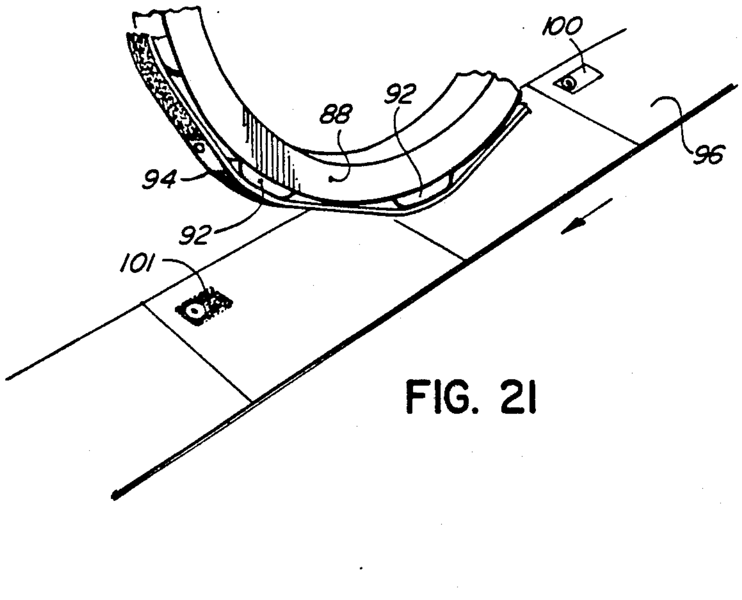
FIG. 21 is an enlarged view of a portion of the apparatus of FIG. 19, the enlarged view illustrating a portion of the periphery of the rotary member and a length of the continuously-fed strip contacted by the ribbon on the rotary member.
Figure 22:
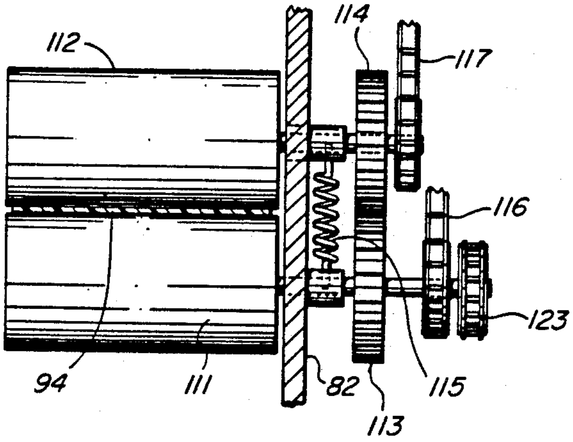
FIG. 22 is a side view of a portion of the practical embodiment of the apparatus, that view being taken along section XXII—XXII of FIG. 20.

The arrangement of gear wheels within rotary member 80 is shown in FIGS. 20 and 22. A fresh roll of the ribbon 94 is mounted on a spool 110, that spool being large enough to hold approximately a four-hour supply of ribbon 94. A pair of rollers 111 and 112 are drive linked by meshing sprockets 113 and 114, respectively, so as to turn at the same speed in opposite directions. Rollers 11 and 112 are biased toward each other by a spring 115 having its end connected to a pair of bushings sitting on the axles of rollers 111 and 112. The axle of roller 112 is mounted in a slot in plate 82 such that roller 112 is capable of a slight sliding movment. Chain 116 extends around a sprocket on the axle of the roller 111 and also around a sprocket connected to hollow axle 84. Chain 117 extends around a sprocket on the axle of roller 112 and also around a sprocket on the axle of spool 110.

After leaving the periphery of rotary member 80, the ribbon 94 passes around a roller 118 at the opening in annular member 88, as shown in FIG. 20. After passing around roller 118, ribbon 94 is pulled between the rollers 111 and 112. It then passes around a further roller 119 before passing partially around the outside of the fresh roll of ribbon 94 on spool 110 and out through the center of hollow axle 84. The fresh supply of ribbon 94 passes around a pair of rollers 120 and 121, then around a roller 122 at the opening in annular member 88, and then onto the periphery of rotary member 80. A suction device (not shown) sits behind the apparatus and pulls ribbon 94 through the centre of hollow axle 84.

A self-governing means is utilized to maintain proper tension on ribbon 94 as it passes around rotary member 80. As rollers 111 and 112 pull used ribbon 94 into rotary member 80, let us assume that the tension increases on that portion of ribbon 94 extending around the periphery. In that case, the portion of ribbon 94 extending around driven roller 121 is pulled more tightly against that roller and slides less on that roller; that portion of ribbon 94 is thereby fed onto the periphery of rotary member 80, i.e. enters at a speed higher than normal. Once the tension is thereby reduced on ribbon 94 on that periphery, ribbon 94 is no longer pulled as tightly against roller 121 and is no longer fed onto the periphery. This process allows the tension on strip 94 to be continuously and automatically regulated. Each of the four driven rollers 110, 111, 112 and 121 are connected together by sprockets and accurately-made chains, 116, 117 and 123, all of those rollers being in turn driven through a second sprocket on hollow axle 84. The position of the chains connecting the four rollers together and to hollow axle 84 are shown in outline on FIG. 20.

Figure 23:
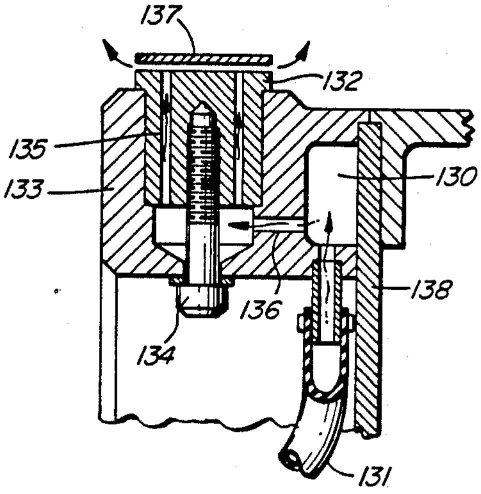
FIG. 23 is a cross-sectional side view through a pad and the surrounding structure of the rotary member periphery in a practical embodiment of the invention, the view illustrating an air cushion construction that may be used to reduce friction between each pad and the ribbon.

FIG. 23 illustrates an air bearing that may be employed at each pad to reduce the friction between the surface of the pad and the ribbon. Air is pumped to an annular plenum 130 extending internally around the periphery of the rotary member. Hose 131, which feeds air to plenum 130, rotates with the rotary member and is connected by a known type of rotary joint (not shown) to an air plenum on the rotational axis of the rotary member. Pad 132 is secured to the annular member 133 of the rotary member by a bolt 134. A series of passages 135 in the pad 132 and a passage 136 in annular member 133 direct air in plenum 130 to the surface of pad 132. An air cushion is thereby created between pad 132 and ribbon 137. Element 138 shown in FIG. 23 is a portion of the circular plate of the rotary member.

We claim:

1. An apparatus having a workstation at which a continuously-fed continuous first medium is brought into repeating engagement with a continuously-fed second medium, to transfer material from one medium to the other, the apparatus comprising:

(a) a rotatable structure having a generally circular periphery along which the first medium is adapted to extend, the rotatably structure having a series of engagement members located on (to) its periphery at equiangular positions around that periphery, the engagement members acting during rotation of the rotatably structure, to press the first medium into repeating engagement with the second medium in the workstation as the engagement members sequentially pass through the workstation to transfer material between the first medium and the second medium;

(b) A first medium advancement mechanism secured to the rotatable structure so as to rotate with the structure, the first medium advancement mechanism being adapted to feed the first medium onto the periphery of the rotatably structure and withdraw the first medium from that periphery after passage of the first medium around substantially the whole periphery of the rotary member, the first medium thereby being adapted to move along the periphery of the rotatable structure in the same direction in which the rotatable structure is adapted to rotate and at a speed greater than the speed of that periphery relative to the speed of the second medium; and (c) a second medium advancement mechanism extending generally tangential to the rotatably structure at the workstation and adapted to carry the second medium through the workstation at the same speed that the first medium passes through the workstation; whereby the rotatable structure and the first medium advancement mechanism are adapted to be driven such that the ratio between the speed of the first medium and the speed of the adjacent periphery of the rotatable structure is (N−1)/(N−2) when N engagement members are present on the rotatable structure.

2. An apparatus as in claim 1, wherein the first medium advancement mechanism is secured to the rotatable structure at a position internal of that structure.

3. An apparatus as in claim 2, wherein the first medium advancement mechanism is driven by a drive linkage means connecting that mechanism to the rotatable structure such that rotation of the rotatable structure advances the first medium along the periphery of that structure at a speed greater than that of the periphery.

4. An apparatus as in claim 3, wherein the first medium advancement mechanism is comprised of a pair of rollers biased toward each other with the first medium being adapted to extend therebetween, the rollers being rotatably driven by a first drive linkage means connecting the rollers to the rotatable structure, rotation of the rollers acting to draw the first medium between the rollers and to pull the first medium along the periphery of the rotatable structure and into that structure.

5. An apparatus as in claim 4, wherein the first medium advancement mechanism also comprises a third roller rotatably driven by a second drive linkage means connecting that roller to the rotatable structure, the first medium extending around the third roller as that medium leaves the rotatable structure, and wherein whenever the tension increases on the first medium as it moves along the periphery of the rotatable structure that medium increases its frictional engagement with the third roller and is thereby fed out of the rotatable structure by that roller, the third roller thereby acting to ensure that a uniform tension is continuously maintained on the first medium as that medium moves around the periphery of the rotatable structure.

6. An apparatus as in claim 1, wherein the second medium is a continuous medium.

7. An apparatus as in claim 1, wherein each engagement member is a pad each of which during its passage through the workstation presses the first medium against the second medium, and wherein the first medium comprises a releasable portion adapted to adhere to the second medium when the two mediums are pressed together in the workstation and to release itself from the first medium as the two mediums move apart on leaving the workstation.

8. An apparatus having a workstation at which a continuously-fed continuous first medium is brought into contact with a continuously-fed second medium, the apparatus comprising:

(a) a rotatable structure a generally circular periphery along which the first medium is adapted to extend, the rotatable structure having a series of engagement members onto its periphery at equiangular positions around that periphery, the engagement members acting during rotation of the rotatable structure, to bring the first medium into repeating engagement with the second medium in the workstation as the engagement members sequentially pass through the workstation;

(b) a first medium advancement mechanism secured to the rotatable structure so as to rotate with that structure, the first medium advancement mechanism being adapted to feed the first medium onto the periphery of the rotatable structure and withdraw the first medium from that periphery after passage of the first medium around substantially the whole periphery of the rotary member, the first medium thereby being adapted to move along the periphery of the rotatable structure in the same direction in which the rotatable structure is adapted to rotate and at a speed greater than the speed of that periphery relative to the speed of the second medium; and (c) a second medium advancement mechanism extending generally tangential to the rotatable structure at the workstation and adapted to carry the second medium through the workstation at the same speed that the first medium passes through the workstation; whereby the rotatable structure and the first medium advancement mechanism are adapted to be driven such that the ratio between the speed of the first medium and the speed of the adjacent periphery of the rotatable structure is (N−1)/(N−2) when N engagement members are present on the rotatable structure, each engagement member being a pad, each of which during its passage through the workstation presses the first medium against the second medium, and wherein the first medium comprises a releasable portion adapted to adhere to the second medium when the two mediums are pressed together in the workstation and to release itself from the first medium as the two mediums move apart on leaving the workstation; and wherein each pad has a series of air flow channels extending through it, those channels being adapted to carry air from an air supply to the surface of the pad to create an air cushion between the surface of the pad and the first medium moving thereacross.

9. An apparatus as in claim 1 wherein each engagement member has means to direct air to the surface of the engagement member to create an air cushion between the surface of the engagement member and the first medium moving thereacross.

10. An apparatus as in claim 1 wherein each engagement member has air flow channels extending through it to create an air cushion between the surface of the engagement member and the first medium moving thereacross.

11. An apparatus as in claim 1 in which the first medium is a ribbon and the second medium is a series of items to each of which material from the ribbon is to be transferred and in which substantially all of the length of the ribbon is adapted to be used.

12. An apparatus for transferring material between a first medium and a second medium comprising (a) a rotatable structure having a generally circular periphery, said first medium being extenable around said circular periphery, said rotatable structure including a first medium advancement means for moving the first medium relative to said circular periphery said first medium advancement means being adapted to continuously feed said first medium onto the periphery of the rotatable structure and continuously withdraw the first medium from that periphery after passage of the first medium around substantially the whole periphery of said rotatable structure, the first medium being adapted to continuously move along the periphery of the rotatable structure in the same direction in which the rotatable structure rotates and at a speed greater than the speed of the circular periphery relative to the speed of the second medium;

(b) said rotatable structure having a series of engagement members located on said periphery at equiangular positions around said periphery;

(c) a continuously fed second medium and a second medium advancement means adapted to carry said continuously fed second medium in a predetermined generally tangential position with respect to said rotatable structure such that said first medium is brought into repeating engagement with said second medium when said engagement members, during rotation of said rotatable structure, are tangentially positioned with respect to said second medium, such that said engagement members press said first medium into repeating engagement with said second medium to transfer material between the first medium and the second medium.

13. The transfer apparatus as claimed in claim 1 wherein said first medium advancement means includes means for governing the speed of said first medium and the speed of the circular periphery of the rotatable structure such that the ratio between the speed of the first medium and the speed of the circular periphery of the rotatable structure is (N−1)/(N−2) where N engagement members are present on said rotatable structure.

14. The transfer apparatus as claimed in claim 12 wherein said engagement members project beyond the circular periphery of said rotatable structure such that said first medium is spaced from the circular periphery of said rotatable structure between consecutive said engagement members.

* * * * *

UNITED STATES PATENT AND TRADEMARK OFFICE
CERTIFICATE OF CORRECTION

PATENT NO. : 4,770,736

DATED : September 13, 1988

INVENTOR(S) : Henry J. Taylor; John A. Fry

It is certified that error appears in the above-identified patent and that said Letters Patent is hereby corrected as shown below:

At column 1,
line 32, change "ae" to --are--.

At column 3,
line 62, change "memoer" to --member--.

At column 7,
line 27, change "impressiOns" to --impressions--.
line 28, change "ribbOn" to --ribbon--.

At column 9,
line 16, after "minute" insert --.--.
line 19, change "l,een" to --been--.
line 27, change "3B" to --38--.
line 40, change "ll" to --lll--.

At column 10,
line 39, change "rotatably" to --rotatable--.
line 40, delete "(to)".
line 43, change "rotatably" to --rotatable--.
line 50, change "the" to --that--. (1st. occurrence)
line 53, change "rotatably" to --rotatable--.

UNITED STATES PATENT AND TRADEMARK OFFICE

CERTIFICATE OF CORRECTION

PATENT NO. : 4,770,736

DATED : September 13, 1988

INVENTOR(S) : Henry J. Taylor; John A. Fry

It is certified that error appears in the above-identified patent and that said Letters Patent is hereby corrected as shown below:

At column 11,
line 55, after "structure" insert --having--.

Signed and Sealed this

Twenty-first Day of February, 1989

*Attest:*

DONALD J. QUIGG

*Attesting Officer*

*Commissioner of Patents and Trademarks*